Sept. 22, 1925.

C. J. COBERLY 1,554,407

CUTTING TORCH WITH ROTATING TIP

Filed March 17, 1924

INVENTOR:
CLARENCE J. COBERLY,
BY

ATTORNEYS.

Patented Sept. 22, 1925.

1,554,407

UNITED STATES PATENT OFFICE.

CLARENCE J. COBERLY, OF LOS ANGELES, CALIFORNIA, ASSIGNOR TO KOBE, INC., OF LOS ANGELES, CALIFORNIA, A CORPORATION OF CALIFORNIA.

CUTTING TORCH WITH ROTATING TIP.

Application filed March 17, 1924. Serial No. 699,944.

*To all whom it may concern:*

Be it known that I, CLARENCE J. COBERLY, a citizen of the United States, residing at Los Angeles, in the county of Los Angeles and State of California, have invented a new and useful Cutting Torch with Rotating Tip, of which the following is a specification.

My present invention being referred to as a cutting torch with a rotating tip; it may be understood to be an object of this invention to provide a torch with means for varying the angle of projections of a cutting jet delivered therefrom relatively to the body of the torch; and it is an object of my invention to do this in a manner favorable to the cutting of a slot of predetermined diameter or shape during a rectilinear or other traversing movement between said torch and a body to be slotted thereby.

It is an object of this invention to provide simple and effective means suitable for a cutting of inwardly or outwardly tapered slots or apertures of various dimensions, or suitable for cutting slots or apertures having an intermediate constriction; and a preferred form of my invention may comprise, in connection with an outer tip or nozzle, which may be fixed relatively to the main body or casting of a torch, an inner tip capable of rotation during the delivery of a cutting gas therethrough. To facilitate the adapting of my torch to the cutting of different slots or apertures, I may optionally employ an inner tip comprising what I herein term a "quill", provided near one end with a rotating means and at its other end with either an integral or a replaceable delivery plug pierced by a non-axial outlet duct or delivery passage for a cutting gas, this gas being preferably fed to said quill at an intermediate point or points during the mentioned relative rotation thereof.

Other objects of my invention will appear from the following description of an illustrative embodiment thereof, taken in connection with the appended claims and the accompanying drawings, in which, Fig. 1 is an elevational view, mostly in section, illustrating advantageous relationships between the respective parts of a torch embodying my invention.

Figure 1:
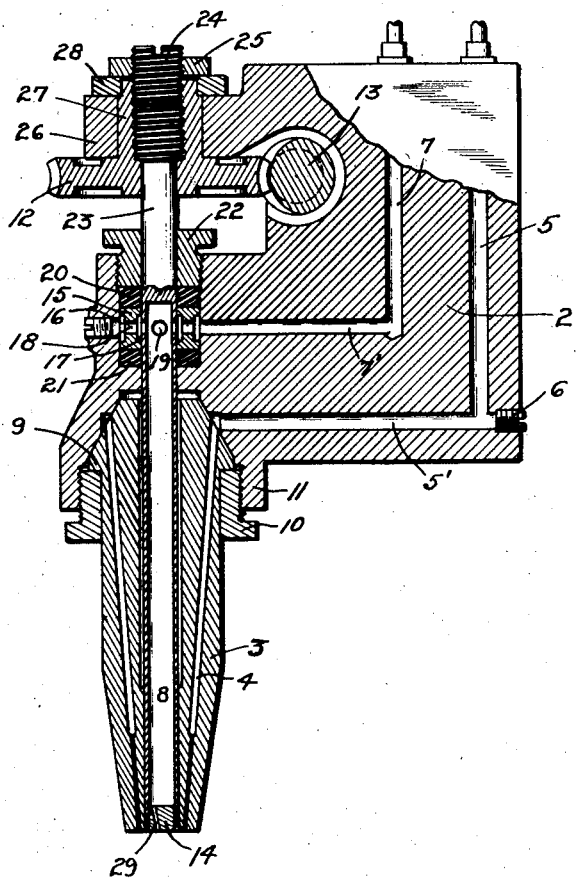

Referring to the details of that specific embodiment of my invention chosen for purposes of illustration, 1 may be a metallic plate or other article to be slotted, and 2 may be the body or main casting of a torch embodying my invention, this main casting being shown as associated with an outer tip or delivery nozzle 3, provided with any suitable number of passages 4 for the delivery of a combustible mixture suitable for use in the heating of a metallic article or surface to a temperature favorable to the cutting thereof by means of a cutting gas.

In addition to the interconnected passages 5, 5' (the latter being shown as plugged at 6) the block 2 may be provided with interconnected passages 7, 7' for the delivery of an excess of a cutting gas into an inner tip 8, shown as mounted in a manner permitting its free rotation within the outer tip or nozzle 3.

Although the nozzle 3 and the inner tip 8 may be of any character suitable to the general purposes indicated above, I consider it advantageous to provide the said nozzle with shoulders 9, adapted to be retained by a bushing 10, shown as having threaded engagement with a projection 11 upon the main body or casting 2; and I consider it advantageous to employ an inner tip 8 in the form of a quill carrying at one end a rotating means such as the worm wheel 12, adapted to be engaged by a worm 13 (which may be rotated at a comparatively high speed by any suitable means not shown) and provided at its opposite or outer end with a delivery plug 14, shown as removably seated by a threaded engagement which permits a ready replacement or substitution of alternative plugs, any suitable means being employed for the continuous introduction of an excess of a cutting gas into the quill 8 for delivery therefrom during its continuous rotation.

My preferred means for introducing oxygen, or its equivalent, into the interior of the inner quill 8 during or regardless of its rotation may comprise a block 15 provided with inner and outer annular channels 17 and 16 connected by a suitable number of lateral ducts 18, which may be equal in number to corresponding apertures 19 extending through the lateral walls of the mentioned quill, the block 15 being shown as retained in position by means comprising packing 20, 21 shown as retained by means of a bushing 22, of a character commonly used in glands and suitable as a bearing for the shaft 23 of the mentioned quill, which may terminate in a threaded head 24, adapted to be engaged by a retaining nut 25.

In order to provide an additional bearing for the rotating parts referred to, an arm 26 extending from the main body or casting 2 of my torch may be tapped to provide a circular opening co-axial with the shaft 23 and of sufficient diameter to receive a circular projection 27 integral with the worm wheel 12 and internally threaded to receive the threaded head 24 of shaft 23, a washer 28 being shown as interposed in a manner favorable to the retention of the parts in their indicated relationship while permitting free relative rotation thereof.

Figure 2:
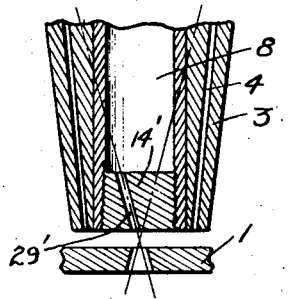
Fig. 2 is a sectional view, upon an enlarged scale, of a rotating tip slightly different from that disclosed in Fig. 1, and so positioned relatively to a plate to be slotted thereby as to produce downwardly divergent walls in the resultant slot.
Figure 3:
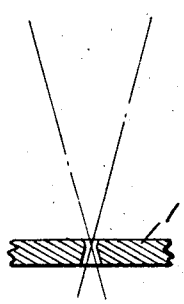
Figs. 3 and 4 are respectively diagrammatic views illustrating the employment of my present invention in the cutting of a slot constricted in an intermediate plane (Fig. 3) and in the cutting of a slot whose walls converge downwardly or inwardly (Fig. 4).
Figure 4:
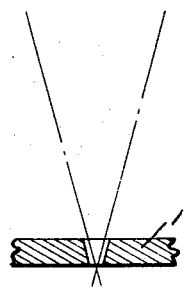

Although it is believed that not only the construction but the general mode of operation of my novel cutting torch may be fully understood from the foregoing description, attention is called to the fact that by the substitution of any desired types of delivery plugs 14, 14' within an inner quill 8 of the character described, the non-axial delivery duct or ducts 29, 29' being given any desired diameter or inclination, a wide variety of cutting results may readily be obtained, the inclination of the walls of a slot cut by my novel torch being, in general, dependent upon the inclination of the passages 29, 29'; and attention is also called to the fact that, as illustrated in Figs. 2, 3 and 4, the character of the slots cut by my novel torch may be varied by a mere change in the perpendicular distance maintained between the tip of the same and the surface of a body slotted thereby. It will be understood that a slot having an intermediate plane of constriction, as in Fig. 3, may be formed by bringing the work closer than it is brought in Fig. 2, the effect illustrated in Fig. 4 being obtainable by a still closer approximation of a suitable tip to the work.

Although I have herein described one complete embodiment of my invention, it will be understood that various features thereof might be independently employed and also that my invention is capable of being embodied in various alternative forms, without the slightest departure from the spirit and scope of the same, as indicated above and in the following claims.

For example, while I have shown the ducts 29 inclined to and pointing towards the axis about which the tip 3 rotates, I may in some cases prefer to form these ducts parallel to said axis or even divergent therefrom, in which event it will be possible to cut a wide slot with a single narrow jet.

I claim as my invention:

1. In a cutting torch, the combination of: a main torch body provided with an outer nozzle element, and an inner tip mounted for rotative movement during use and within said outer nozzle.

2. In a cutting torch of the character described in claim 1, an inner tip provided with a non-axial delivery duct.

3. In a cutting torch as described in claim 1, an inner tip having a delivery duct inclined relatively to its axis of rotation.

4. In a cutting torch as described in claim 1, means for rotating said inner tip.

5. In a cutting torch as described in claim 1, means for delivering a combustible mixture through said outer nozzle and for delivering a cutting gas through said inner tip.

6. In a cutting torch as described in claim 1, an inner tip in the form of a quill within which alternative delivery plugs may be substituted.

7. In a cutting torch, a tip provided with a non-axial delivery duct and with means for its rotation during use.

8. In a cutting torch, a tip comprising a quill provided at one end with means for its rotation, and at its opposite end with a delivery plug having a non-axial passage for the delivery of a cutting gas.

In testimony whereof, I have hereunto set my hand at Los Angeles, California, this 7th day of March, 1924.

CLARENCE J. COBERLY.